July 5, 1966 D. E. MEIER ETAL 3,259,756
COMPLEMENTARY BRIDGE DIFFERENTIAL CONTROL CIRCUIT
Filed April 1, 1963

INVENTORS
DON E. MEIER
CHARLES A. OPPEDAHL
BY
Moody & Anderson
AGENTS

United States Patent Office 3,259,756
Patented July 5, 1966

3,259,756
COMPLEMENTARY BRIDGE DIFFERENTIAL CONTROL CIRCUIT
Don E. Meier, Minneapolis, Minn., and Charles A. Oppedahl, Cedar Rapids, Iowa, assignors to Collins Radio Company, Cedar Rapids, Iowa, a corporation of Iowa
Filed Apr. 1, 1963, Ser. No. 269,421
6 Claims. (Cl. 307—88.5)

This invention relates generally to control circuitry and more particularly to a control circuit providing double-ended control for a two terminal load in response to a three-wire differential input drive signal.

The control circuit of the present invention finds especial usage in the double-ended or full-wave control of permanent magnetic D.C. motors where, as is ofttimes desirable, the motor is to be controlled from a source of differential control voltage of the three-wire type. For example, magnetic amplifier motor drive circuitry of the type designed to drive split-phase D.C. motors are known which may not directly be utilized in controlling two terminal loads in a differential manner.

The primary object of the present invention is, therefore, the provision of a novel circuit by which double-ended or reversible control for a two terminal load may be developed from a three-wire driving source.

A further object of the present invention is the provision of a bridge-type control circuit by which double-ended control of a two terminal load, such as a permanent magnetic D.C. motor, may be realized in response to a three-wire balanced input source of the differential pulse type.

Still another object of the present invention is a provision of a control circuit with improved operational efficiency.

The invention is featured in the provision of a bridge control circuit with which a two-terminal load may be operably connected so as to see a symmetrical A.C. square wave "zero" control signal whereby the quiescent or null A.C. current may be limited to a low value and wherein the quiescent D.C. current through the load is zero.

These and other objects and features of the invention will be apparent upon reading the following description in conjunction with the accompanying drawings in which.

Figure 1:
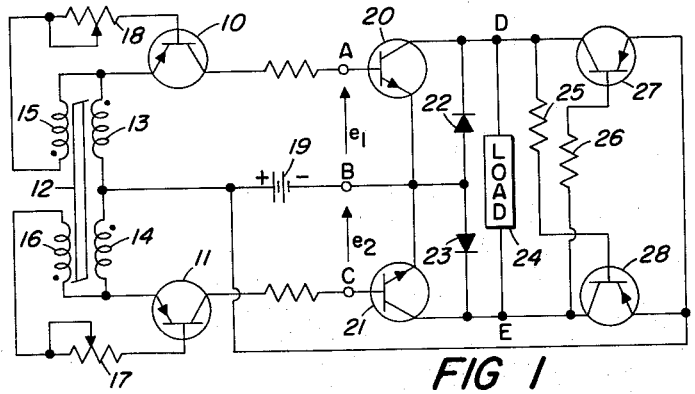
FIGURE 1 is a schematic embodiment of the present invention as it might be utilized with an input drive circuit which provides differential pulse width modulation control features.

The control circuit of the present invention is illustrated schematically in FIGURE 1 in conjunction with a known drive circuit of the type which develops a pulse width modulated output which is differential in nature. The circuitry of the present invention is generally that to the right of the terminals designated A, B, and C and for purposes of the present invention, the input to the invention is comprised of a three-wire source which might correspond to the terminals A, B, and C of FIGURE 1.

As above described, the input is a double-ended or three-wire source exhibiting differential pulse width modulation control characteristics.

Figure 2:
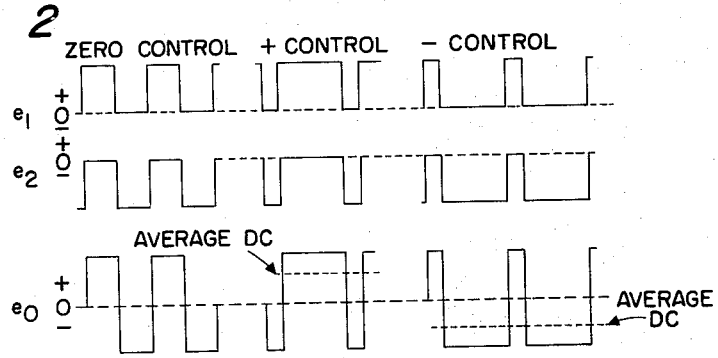
FIGURE 2 is a diagrammatical representation of input control wave forms of the differential pulse width modulation type, illustrating the principles of proportional control.

FIGURE 2 illustrates the input wave form in terms of the voltages $e_1$ from terminal B to A, $e_2$ from terminal C to B, and the differential or combined input $e_0$ from terminal C to A.

Under the conditions of "Zero control" the voltages $e_1$ and $e_2$ are seen to be symmetrical square wave voltages in the form of pulsating D.C. with the respective voltages $e_1$ and $e_2$ being 180° out of phase. Reference to FIGURE 2 under this condition of "zero control" shows the differential, or combined output voltage, $e_0$, as being a symmetrical square wave alternating voltage having an average D.C. value equal to zero. The input wave form may be further defined for control conditions either "positive" or "negative" wherein the pulse widths as defined by the wave forms $e_1$ and $e_2$ are no longer symmetrical as concerns their "on" and "off" times. Thus, under conditions of positive control, the output $e_1$ is positive for a longer period of time and is proportionately zero for a lesser period of time as compared to the "zero control" condition. Conversely, the output $e_2$ is negative for a less period of time and zero for a proportionately less period of time. The differential output wave form $e_0$ is then seen to have an average direct current component which is positive. Stated another way, the voltage $e_1$ and $e_2$ might represent the application of the positive terminal of a D.C. voltage source alternately to terminal A and C with terminal B being the other voltage source terminal and common to each of voltages $e_1$ and $e_2$.

Under conditions of "negative control," the wave forms $e_1$ and $e_2$ are seen to be unbalanced in the opposite sense. As illustrated in FIGURE 2, the negative control condition is such that the output wave form $e_0$ has a net negative average or direct-current component. The input wave form is thus seen to be that of a three-wire differential control signal based on differential pulse width modulation.

The particular wave forms of FIGURE 2 are those which might be developed by the control circuitry illustrated generally to the left of terminals A, B, and C of FIGURE 1. This drive circuitry is described in co-pending application, Serial No. 184,357, filed April 2, 1962, entitled "Servo Amplifier Circuits," now Patent No. 3,176,243, and assigned to the assignee of the present invention. As defined in the co-pending application, the control circuitry of FIGURE 1 employs a transistorized switching circuit comprised of transistors 10 and 11 in conjunction with a saturable core member 12, windings 13–16, and control members 17 and 18. The differential variation of members 17 and 18 controls the resistance reflected into the control circuit loops such that the output at terminals A, B and C is one exhibiting differential pulse width modulation.

Figure 3A:
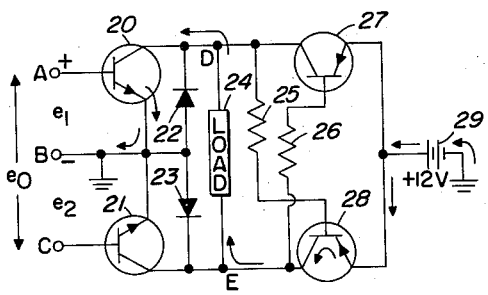
FIGURES 3A and 3B are schematical representations of the control circuitry of the present invention illustrating the operational principles by means of current flow paths.

The present invention relates, then, to further control circuitry in conjunction with which a two terminal load may be controlled by the three-wire differential pulse-width modulated input ABC. The present invention, as illustrated in FIGURES 1 and 3, is in the form of a full-wave reversible bridge made up of transistor complementary pairs. The circuitry functions as an amplifying commutator which controls current flow through the load 24 such that the load (for example, a permanent magnetic D.C. motor) may be properly responsive to and controlled by a differential three-wire input as defined above.

With reference to FIGURE 1, the load terminals D and E are respectively connected to the collector elements of input transistors 20 and 21. A pair of complementary-type transistors 27 and 28 also have their collector elements respectively connected to the load terminals D and E. The base and collector electrodes of transistors 27 28 respectively are cross-coupled through resistors 26 and 25. The emitter electrodes of transistors 27 and 28 are connected in common to the positive terminal of D.C. voltage source 19, while the negative terminal of the D.C. source 19 is referenced to the common input terminal B to which the emitter electrodes of transistors 20 and 21 are connected. In the configuration of FIGURE 1, the D.C. voltage source 19 actually serves a dual function in powering the output control circuitry of the present invention and, additionally, powering the input control circuit which develops the input wave forms of FIGURE 2. The invention might best be comprehended by reference to FIGURE 3 wherein the input terminal B is shown to be conventionally grounded while the direct current voltage source is illustrated as source 29, the positive terminal of which is connected to the emitters of transistors 27 and 28, with the negative terminal thereof referenced to common ground as is common input terminal B.

In operation, the control circuitry serves to connect or switch the direct current voltage source 29 across the load terminals D and E with alternate polarity as controlled by the input wave forms $e_1$ and $e_2$. Operation of the circuit may best be comprehended by a consideration first of the control applied to load 24 under the above defined "zero" control input signal condition. Considering that interval when voltage $e_1$ is positive and voltage $e_2$ is zero, as indicated for alternate half cycles of the wave forms of FIGURE 2, the application of a positive voltage to the base of transistor 20 with respect to its emitter turns transistor 20 on. When transistor 20 conducts, the collector of transistor 20 is brought substantially to the emitter potential which is referenced to ground. Thus, the base electrode of transistor 28 is grounded through resistor 25 and the collector-to-emitter junction of transistor 20, respectively. The completion of this ground path causes transistor 28 to conduct, and the positive terminal of D.C. source 29 is connected through the emitter-collector of transistor 28 to load terminal E. The resulting flow of current through the load is that indicated in FIGURE 3A wherein load current is seen to flow emitter-to-collector on transistor 28, through the load 24, and the collector-to-emitter on transistor 20 to the common ground return.

A diode member 23 serves as a diverter diode during this control interval to protect the transistor against inductive voltage transients should the load be inductive. Diode member 23 is seen to shunt the emitter collector junction of transistor 21 with the anode of the diode connected to common ground. During this control interval, second diode member 22 is inactive since both its anode and cathode are at ground potential. Diode member 22 is seen to be likewise connected between emitter and collector as concerns transistor 20.

Figure 3B:
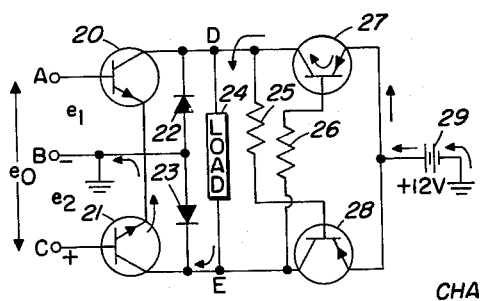

Now, considering the next input voltage interval during which voltage $e_2$ is not zero while voltage $e_1$ is zero, the current flow path illustrated in FIGURE 3B is realized. The application of voltage $e_2$ causes transistor 21 to conduct, thus grounding load terminal E through transistor 21 and additionally the base of transistor 27 through interconnecting resistor 26 so as to turn on transistor 27. The positive terminal of the D.C. source is then connected to load terminal D and the direction of load current is reversed, flowing emitter-to-collector on transistor 27, through the load from terminal D to E, and the collector-to-emitter on transistor 21. Diode member 22 becomes the active diverter diode for this control interval. During alternate control intervals the load terminals are thus effectively connected across the D.C. voltage source with opposite polarity.

From the above description, it is seen that in response to the zero control symmetrical input wave forms, the current flows through the load alternately in opposite directions and the load is "driven" by a square wave alternating voltage with peak amplitude determined by the direct voltage source 29. The quiescent direct current flow is zero due to a balanced condition and the quiescent alternating current flow is determined by the input signal oscillation frequency and the impedance of the load at this frequency.

When differential control is applied to the control circuit of the present invention, the one-half cycle periods of the load voltage change differentially, resulting in a net value of D.C. load current. Thus, for a condition of positive control the time preponderance of the voltage $e_1$ as compared to voltage $e_2$ causes a net D.C. control current to flow from terminals E to D in the load 24. Under conditions of negative control, a net direct current flows in the opposite direction through the load from terminal D to terminal E.

The illustrated embodiment of the present invention shows the complementary transistor pairs placed within the bridge such that the input (illustrated as alternate application of positive potential from the common terminal to the other input terminals) is of a proper potential to effect forward biasing of the input transistors. It is to be realized that the transistors in each of the complementary pairs might be interchanged in which case the positive terminal of the voltage source 29 would connect to the common ground and the input control signals $e_1$ and $e_2$ would affect alternate application of a negative potential between the common input terminal and the other input terminals.

When utilizing the present invention to drive a permanent magnetic D.C. motor, a high degree of efficiency is realized, since the motor sees a symmetrical A.C. square wave signal at null condition. By using a high oscillation frequency, the inductive reactance of the motor armature limits the null or quiescent current to a low value while inherently the net direct current quiescent voltage is zero. Further, when utilized as a control for a permanent magnetic D.C. motor, the present invention has a distinct advantage of eliminating the need for a rate circuit. This is true, because the motor sees a low impedance driving source which is the requirement for damping in a permanent magnetic motor.

The diverter diodes 22 and 23 eliminate inductive voltage kicks caused by an inductive load field going to zero, similar to a diode placed across a relay coil. The diverter diodes 22 and 23, as utilized in the present invention serve this same purpose. While diverter diodes are commonly known to be used in three terminal load devices, such as split field motors, the present invention makes it possible to add diverter diodes to a two terminal double-ended load.

The present invention is thus seen to provide a means for controlling a two-terminal direct current load from a three-wire input signal which exhibits differential pulse width modulation control characteristics.

Although the invention has been described with respect to a particular embodiment thereof, it is not to be so limited as changes might be made therein within the scope of the invention as defined in the appended claims.

We claim:

1. A differential control circuit for a two-terminal direct-current load whereby said load may be reversibly controlled from a three-wire differential pulse-width modulated drive signal source; said control circuit comprising a four terminal bridge network the respective arms of which comprise switching means, a source of direct current voltage, said source of current voltage forming a first diagonal of said bridge network, said load forming the other diagonal of said bridge, said three-wire drive signal source having a first common terminal thereof connected to the common junction between first and second ones of said switching means and said direct current voltage source, said first and second switching means being responsive to said drive signal to alternately close in repetitive sequence, control means interconnecting each of said first and second switching means with respective oppositely disposed ones of the others of said switching means in response to which said others of said switching means are respectively closed in response to the closing of the interconnected one of said first and second switching means, whereby said load is alternately serially connected in opposing polarization with said direct current voltage source, the net direct current voltage across said load being zero in response to a respectively equal closed and open time intervals of said first and second switching means, and the net direct current voltage across said load being respectively positive and negative in response to mutually opposite differential variations of said first and second switch open and closed time intervals.

2. A control circuit as defined in claim 1 wherein each of said switching means comprises a unilateral conduction device, the first and second ones of said unilateral conduction devices being oppositely polarized with respect to the common junction therebetween and the diagonally opposite ones of said unilateral conduction devices being oppositely polarized with respect to the interconnected ones of said first and second unilateral conduction devices, the application of said drive signal alternately biasing said first and second ones of said unilateral conduction devices to a conductive state, said interconnecting means between said first and second unilateral conduction device and the respective oppositely disposed ones of said unilateral conduction devices comprising means by which the respective other ones are rendered conductive by application of biasing voltage thereto through the conducting one of said first and second unilateral conduction devices.

3. A control circuit as defined in claim 2 including a fourth unilateral conduction device connected across said first unilateral conduction device and a fifth unilateral conduction device connected across said second unilateral conduction device, said fourth and fifth unilateral conduction devices being adapted to pass current in a direction opposite that of the associated one of said first and second unilateral conduction devices.

4. A differential control circuit as defined in claim 1 wherein each of said first and second switching means and its interconnected oppositely disposed switching means comprises a transistor complementary pair, each of said transistors having an emitter and collector electrode connected respectively to the terminals of said bridge, said common junction between said first and second transistors and said direct current voltage source being connected to a common terminal of said three-wire differential drive signal source, the base electrode of each of said first and second transistors being connected respectively to second and third terminals of said three-wire differential drive signal source, the base electrode of each of said oppositely disposed transistors being connected through the emitter-collector path of the associated one of said first and second transistors to said common terminal, said drive signal source alternately forward-biasing said first and second transistors in response to which the interconnected ones of said oppositely disposed transistors are forwardly biased to effect serial interconnection of said load with said direct current voltage source in sequential oppositely polarized intervals.

5. Control circuit as defined in claim 4 further including first and second diodes respectively connected between the emitter and collector electrodes of each of said first and second transistors with each of said diodes being adapted to pass current in a direction opposite that of the associated one of said first and second transistors.

6. A control circuit as defined in claim 4 wherein said three-wire differential drive signal source comprises means for sequentially and alternately switching said direct current voltage source across the base-emitter junction of said first and second transistor with a polarity affecting forward bias of said first and second transistors, said first and second transistors being rendered conductive in response to the forward biasing thereof, and said direct current voltage source thereby being connected across said oppositely disposed ones of said transistors through the emitter-collector junction of said first and second transistors to affect forward biasing thereof, whereby said direct current voltage source is alternately serially connected through one of said transistor complementary pairs to said load, the average direct current voltage being applied to said load thereby being a function of the differential conductive time intervals of said first and second transistors.

References Cited by the Examiner

UNITED STATES PATENTS

| | | | |
|---|---|---|---|
| 2,994,044 | 7/1961 | Straube | 307—88.5 |
| 3,059,067 | 9/1962 | Merrill et al. | 330—15 |
| 3,080,534 | 3/1963 | Paynter | 331—110 |
| 3,172,059 | 3/1965 | Freeborn | 331—110 |
| 3,175,100 | 3/1965 | La Mothe | 307—88.5 |

ARTHUR GAUSS, *Primary Examiner.*

J. BUSCH, *Assistant Examiner.*